United States Patent [19]

Dalaba et al.

[11] Patent Number: 4,776,188
[45] Date of Patent: Oct. 11, 1988

[54] LOCKING AND ALARM COMBINATION SECURITY DEVICE

[75] Inventors: O. Gene Dalaba, 1036 Regent St., Alameda, Calif. 94501; David C. Joly, Berkeley, Calif.

[73] Assignee: O. Gene Dalaba, Alameda, Calif.

[21] Appl. No.: 946,456

[22] Filed: Dec. 23, 1986

[51] Int. Cl.⁴ ............................................. E05B 67/06
[52] U.S. Cl. ........................................ 70/49; 70/233; 70/57
[58] Field of Search ......... 70/233, 439, 441, DIG. 99, 70/49, 51, 57, 58

[56] References Cited

U.S. PATENT DOCUMENTS

| | | | |
|---|---|---|---|
| 2,933,915 | 4/1960 | Gossner | 70/49 |
| 3,435,642 | 4/1969 | Del Pesco | 70/49 |
| 3,755,778 | 8/1973 | Kennedy et al. | 70/233 |
| 3,781,861 | 12/1973 | Adler et al. | 70/233 X |
| 3,824,540 | 7/1974 | Smith | 70/233 X |
| 3,906,758 | 9/1975 | Hurwitt | 70/76 X |
| 3,910,081 | 10/1975 | Pender | 70/233 |
| 3,993,987 | 11/1976 | Stevens | 70/49 X |
| 4,033,160 | 7/1977 | Mima | 70/233 |
| 4,037,441 | 7/1977 | Ray | 70/233 |
| 4,057,986 | 11/1977 | Zolke et al. | 70/233 |
| 4,086,795 | 5/1978 | Foster et al. | 70/233 |
| 4,098,099 | 7/1978 | Smith | 70/49 X |
| 4,188,808 | 2/1980 | Valdez | 70/233 |
| 4,404,822 | 9/1983 | Green | 70/233 |

FOREIGN PATENT DOCUMENTS 2109109 5/1983 United Kingdom ................ 70/439

Primary Examiner—Gary L. Smith
Assistant Examiner—Suzanne L. Dino
Attorney, Agent, or Firm—Flehr, Hohbach, Test, Albritton & Herbert

[57] ABSTRACT

A security device for movable objects such as a bicycle includes a lock box that is attached to the movable object, a locking chain that physically secures the lock box and movable object to an immovable object such as a bike rack, and an electric alarm circuit. The alarm circuit is armed by a lock switch that closes the lock box and is set off by severing of the cable, which is an integral part of the alarm circuit. Alternatively, the cable and lock box include an optical conduction path which is sensitive to tampering and difficult to bypass.

9 Claims, 5 Drawing Sheets

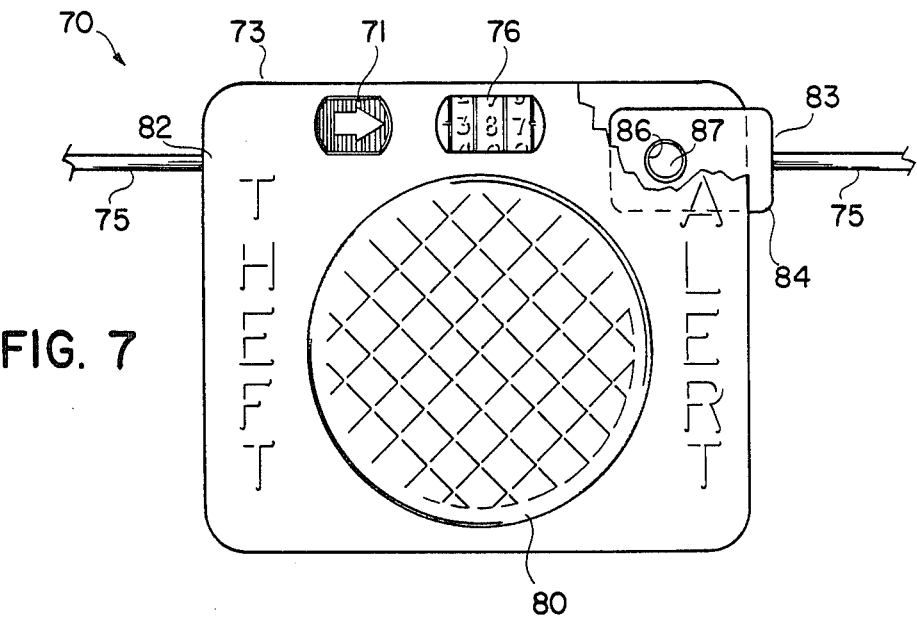
FIG. 7
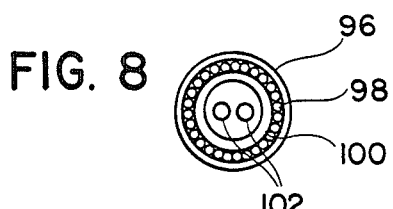
FIG. 8
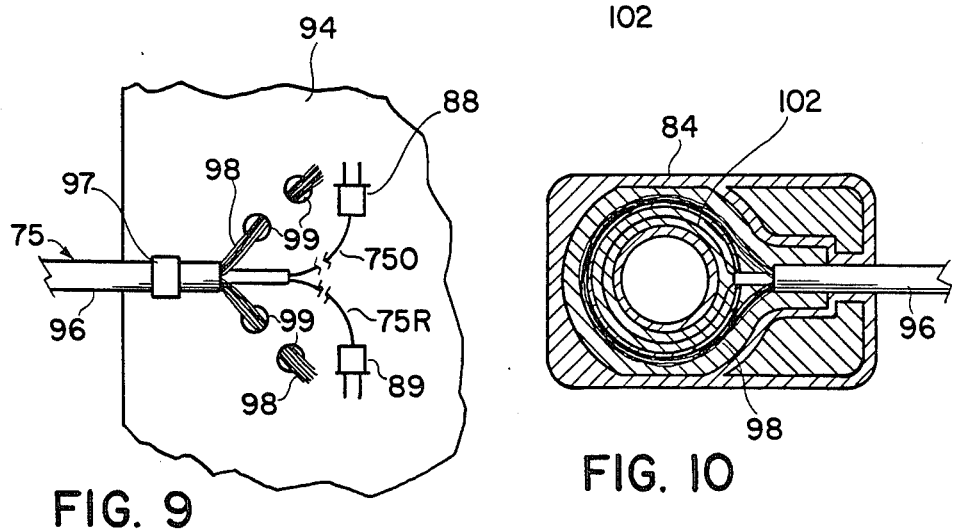
FIG. 9
FIG. 10

LOCKING AND ALARM COMBINATION SECURITY DEVICE

This is a continuation-in-part of co-pending U.S. patent application, Ser. No. 764,923, filed Aug. 12, 1985, now abandoned.

BACKGROUND OF THE INVENTION

The present invention relates to a portable security device and, in particular, to a combined lock and alarm system for bicycles and the like.

It should be mentioned that the present invention is described here with respect to cycles such as bicycles and motor-driven cycles and the like. However, as will be readily apparent from the description and claims, the invention is applicable in general to secure and protect essentially any type of movable object to which it can be attached.

Locking devices are available for physically securing a protected object such as a bicycle to an immovable object. For example, bicycles and motorcycles can be secured by a locking chain to posts or bicycle racks or other immovable objects. In addition, there exist alarms which can be attached to a device and which are actuated, for example, by movement of the device. However, neither locking devices nor alarms provide adequate security against theft when used alone. The chain locking devices can be cut or broken and the protected object removed without any alarm being raised, whereas an alarm system alone does not provide sufficient deterrent to stop a would-be thief from simply removing the object.

As is apparent from the above discussion, it is desirable to have a security system which combines the features of physical locking restraints and alarms. It is, accordingly, a primary object of the present invention to provide such a combination security system.

It is also an object of the present invention to provide a combined locking and alarm device or system which is compact and of light weight and whose alarm function is armed by the act of locking the device in place and set off if the lock is broken.

SUMMARY OF THE INVENTION

The above and other objects of the present invention are accomplished by a security system or device which, in one aspect, comprises a hinged lock box that is configured so that it can be mounted on the protected object; a reel-type cable mounted within the box and extendible from the box and about an immovable object such as a bicycle rack for securing the box to the object; and a locking switch for locking the box in the closed position and securing the cable within the box. The security cable is also an integral part of a lock box alarm circuit, which typically includes visual and audible alarms. Thus, an attempt to remove the locked security box and protected object, as by cutting or breaking the cable, sets off the visual and/or audible alarms. As a consequence, the security system provides the dual deterrent of a chain lock and an alarm system. Alternatively, the electrical alarm circuit includes an optical link, whose continuity is independent of mechanical connection, and increases the sensitivity to tampering and the difficulty in bypassing or bridging the circuit.

BRIEF DESCRIPTION OF THE DRAWINGS

The above and other aspects of the invention are described in detail with respect to the appended drawings in which:

FIG. 7 depicts the alternative optics fiber-based lock box, partially broken away for clarity;

FIG. 8 is a transverse cross-section of the optical/mechanical security cable taken along lines 8—8 (not shown) in FIG. 6; and FIGS. 9 and 10 illustrate details of the cable of FIG. 6 at the fixed and detachable ends, respectively.

DETAILED DESCRIPTION OF THE INVENTION

Figure 1:
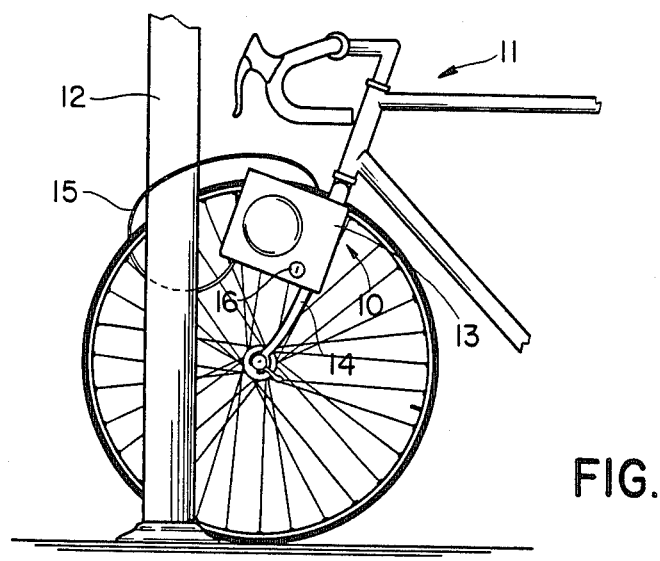
FIG. 1 depicts the method of attaching a bicycle to a post or bicycle rack using the security device of the present invention.
Figure 4:
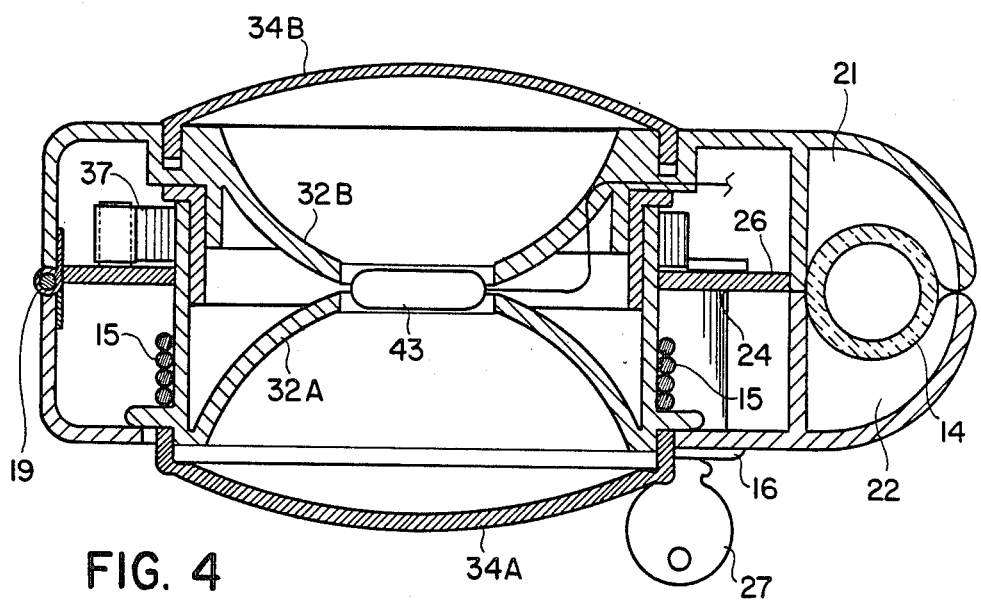
FIG. 4 is a cross-sectional view of the device of FIG. 1 with the lock box closed.
Figure 2:
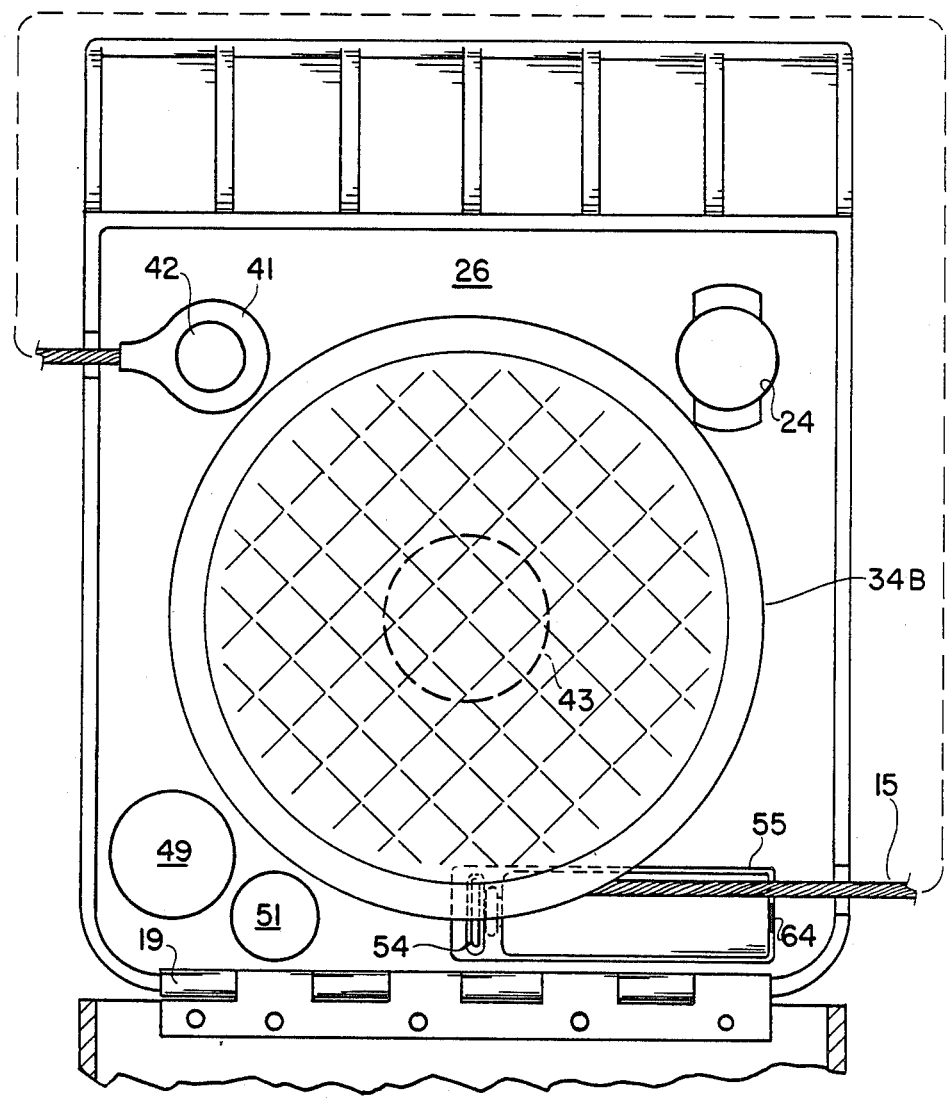
FIG. 2 is an elevation view of the security device of FIG. 1 shown with the lock box pivoted open.
Figure 3:
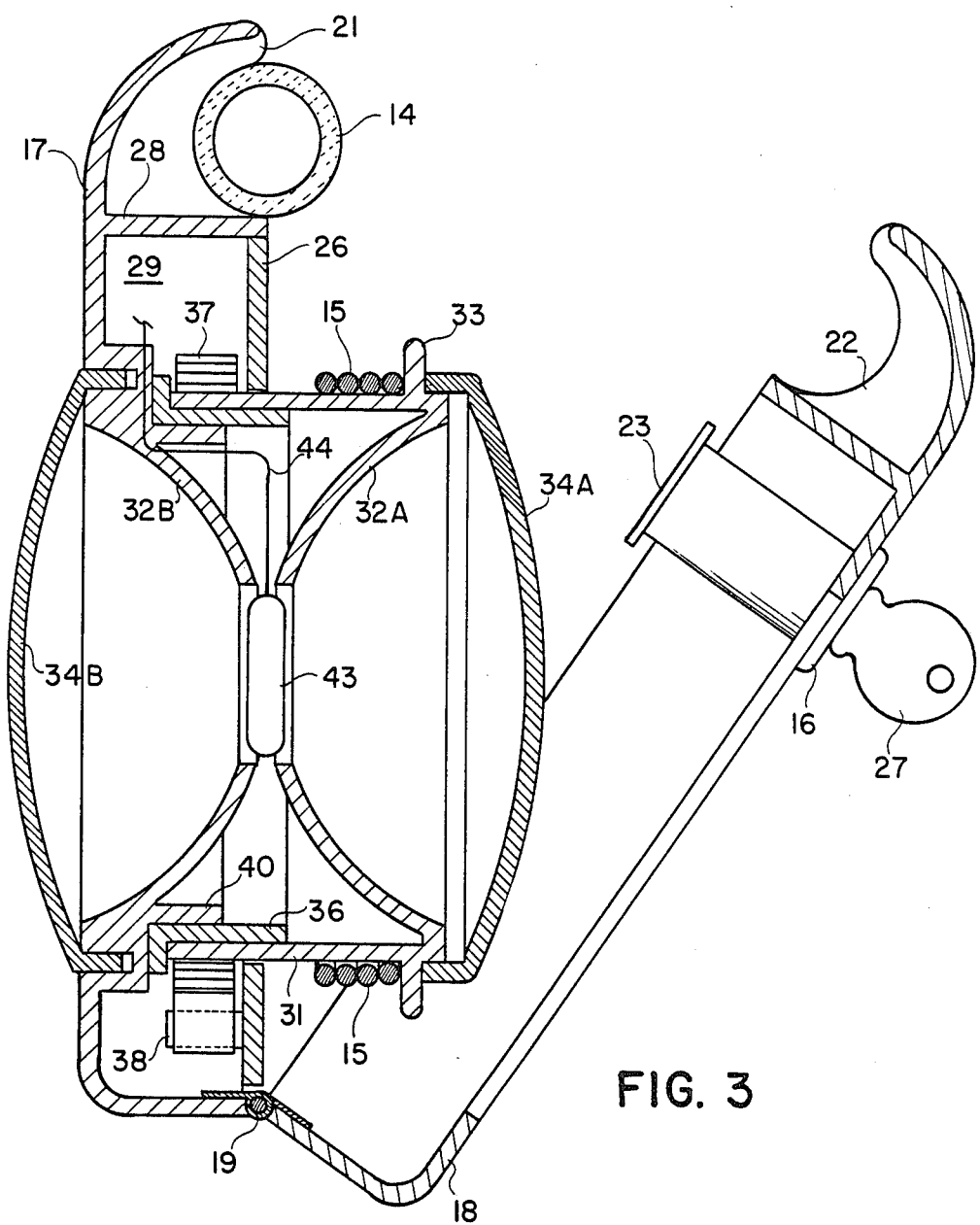
FIG. 3 is a cross-sectional view of the device of FIG. 1 with the lock box pivoted open.

FIG. 1 depicts one use for the security device 10 of the present invention, namely, to secure an object 11, such as a bicycle, to an immovable object 12 such as a post or bicycle rack. A lock box 13 of the security device 10 is constructed for mounting over a front fork 14 or other member of the protected object 11. Cable 15 extends from the lock box 13 and around the post 12 for securing the lock box and bicycle to the post. A key switch 16 locks the case 13 in position on the bicycle and also locks the extended cable to the case. As described below, the cable physically locks the bicycle to the post and is part of an alarm circuit, the operation of which is triggered in the event an attempt is made to remove the bicycle by severing the cable 15. Referring now generally to FIGS. 2–4, the lock box 13 comprises a case 17 and lid 18 which are pivotally joined at one end by hinge 19. The case and lid incorporate concave ribs 21 and 22 at the opposite end that are shaped to cooperatively mount the lock box on the fork 14 or other member of the protected object when the lock box is closed. The key switch assembly 16 is mounted to the lid 18 and includes a shaped inner latch 23 which is inserted through a correspondingly shaped aperture 24 (FIG. 2) in closure plate 26, then locked in place by turning key 27, to thereby lock the two side members 18 and 19 together about the front fork 14. The key switch assembly 16 is the type which includes a pair of switches 16A and 16B (FIG. 5) that are closed when the key switch is locked. These switches control the arming and operation of the alarm circuit 45, FIG. 5. Alternatively, the switches 16A and 16B could be discrete switches which are closed by the key switch.

The closure plate 26 is releasably mounted, by press fit, to the inner rib 28 (FIG. 3) and sides 29 of the case 17. A spring loaded take-up reel 31 is inserted through an aperture in the plate 26. The cable 15 is attached at its inner end to the reel 31. The reel 31 comprises a generally cylindrical body having a concave inner reflector surface 32A and an annular flange 33 for mounting a transparent lens or cap 34. The case 17 also comprises a concave reflector surface 32B, and a transparent lens or cap 34B which is mounted within an annular slot in the case 17. The reel 31 is a press fit on spool 36 which, in turn, is mounted as a loose running fit on case 40. A multi-turn spiral spring 37 is mounted over the reel 31 and is attached at one end to a post 38 on the closure plate and at the opposite end to the reel 31. This spring is secured against lateral movement within the case by the closure plate 26. The spring force winds the cable about the reel 31 and eliminates slack when the cable 15 is extended as shown in FIG. 1. The cable 15 typically comprises about six feet of plastic-covered stranded steel wire and terminates in an eye 41, FIGS. 2 and 5. To lock the bicycle 11, FIG. 1, to the post 12, the cable 15 is passed through the wheel of the bicycle, around or through the post and back into the lock box 13, where the eye 41 is hooked over post 42 on the closure plate. The post 42 secures the cable 14 mechanically and also connects the cable electrically into the alarm circuit 45 shown in FIG. 5. Thus, closing and locking the box 11 with the extended cable hooked onto post 42 secures the mechanical and electrical security connections.

As shown in FIG. 3, a lamp 43 is held in the plane between the two reflectors by the wiring 44 that connects the lamp to the associated alarm circuit 45. Alternatively, the lamp 43 could be mounted to the reflector 32B. The electrical wiring 44 is routed through an aperture in the base of the reflector 32B around the rotating spool-ring-spring parts for connection to the circuit 45 at the closure plate. The lamp 43 preferably is a high voltage gas discharge tube which is available commercially as a U-shaped glass tube.

Figure 5:
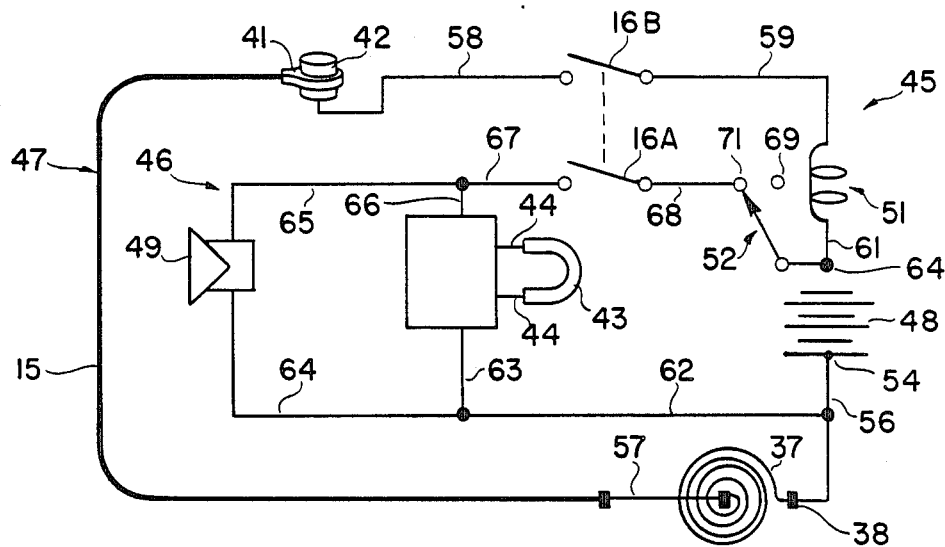
FIG. 5 is an electrical schematic of the alarm circuit used in the security device of the present invention.

FIG. 5 depicts the combined mechanical locking cable and alarm electrical circuit 45. The dual security circuit includes an alarm circuit 46 and a physical locking-alarm arming circuit 47. The first or alarm circuit 46 comprises a series circuit of a battery 48, such as a standard 9 volt transistor battery, lamp 43 and siren 49, key switch 16A and the switching contact 52 of relay 51. The lamp 43 is connected in parallel across the battery 48 via a conventional inverter which turns the lamp on and off rapidly. Referring to FIG. 2, the battery 48 is mounted within a housing 55 on the closure plate 26. The siren 49 and relay 51 are also preferably mounted on the closure plate, as shown schematically in FIG. 2. Referring further to FIG. 5, the second circuit 47 comprises a series arrangement of the battery 48, spring 37, cable 15, key switch 16B and the coil of the relay 51. The interconnections between the components include connection 56 routed along the closure plate 26 between the positive battery housing contact 54 and the spiral spring mounting post 38, connection 57 along the reel 31 between the opposite end of the spring 37 and the inner end of cable 15, connection 58 between the cable post 42 and the key switch 16B, connection 59 between the key switch 16B and the relay coil and connection 61 between the coil and the negative battery contact 64. Preferably all the interconnections 56 and 58–61 between the circuit components are provided by routing wiring along the closure plate 26 or, alternatively, by forming the board as an electrical printed circuit which incorporates plated wiring paths. The interconnections 62–68 for the alarm circuit 46 are also routed along the closure plate 26. The key switches 16A and 16B are closed by rotation of the metallic latch 23, FIG. 3, to the closed locking position. Referring to FIGS. 1 and 5, as mentioned previously, when the lock box 13 is mounted on the bicycle member 14 and the cable 5 is extended about the post or rack 12 and back into the box onto the post 42, locking of the switch 16 then secures the cable 15 mechanically to the post 42 and further connects the cable electrically to complete the locking and arming circuit 47. Closure of circuit 47 energizes the coil to move the contact 52 to the open position 69. At the same time, closure of the switch 16A arms the alarm circuit 46 by completing the circuit path between circuit segments 67 and 68. With the key switch 16 locked, if the circuit 47 is broken by severing the cable 15 in an attempt to remove the bicycle from the post 12, the coil releases the contacts 52 to the normally closed position 71, thereby closing the armed circuit 46 and turning on the flasher 43 and siren 49 until the battery 48 is drained or the switch 16 is unlocked. When the cable 15 is connected, the circuit 45 draws some current which will eventually drain the battery. However, the resistance of the relay 51 limits this current draw. Even for electromechanical relays 51, the current draw can be made so small as to have no practical effect on battery life. In consumer products of this type, a transistor can be substituted for the relay 51 to perform the switching function, at a lower applied cost. In addition, a convenient low cost approach for forming the case is to employ injection molded polycarbonate for essentially all the case components except the spring, hinge and key switch. In addition, as mentioned, most of the circuit components are mounted on the closure plated 26 and are conveniently interconnected by discrete wires or by forming the closure plate as a printed circuit board assembly. Preferably, all the assembly is by press fit or solvent bonding. Alternatively, the lid 18 of the box 13 could have the additional function of preventing further extension of the reel 31, by incorporating features on its interior surface which lock with, and prevent rotation of, the reel after closure of the lid. Also, the shape of the opening for the lens end of the reel 33 could be shaped, for example, as a polygon to prevent rotation.

Figure 6:
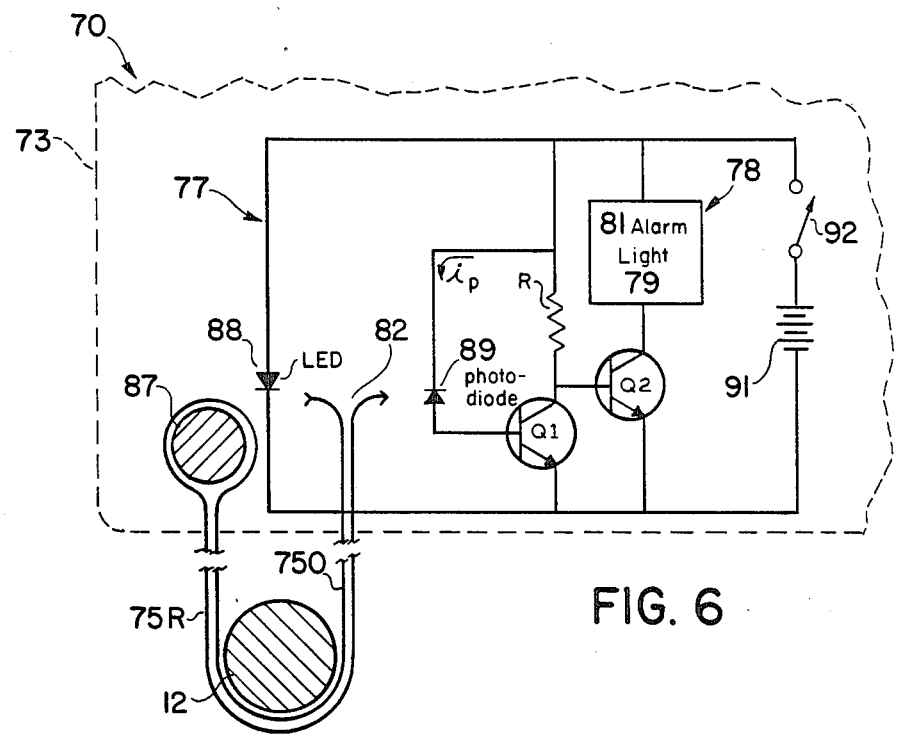
FIG. 6 is a schematic of the combined fiber optics and electrical circuit of an alternative embodiment of our security device.

FIGS. 6–10 depict an alternative embodiment 70 of our security device 10 which uses a fiber optics cable for triggering the speaker/light alarm. Referring to FIGS. 6 and 7, the fiber optics-based security device 70 is used in the same manner as the security device 10. That is, device 70 includes an openable lock box 73, which is similar to lock box 13, and which may comprise a latch button 71 for releasing the latch (not shown) to permit opening the case; a lock 76, illustratively, a combination lock, for securing the lock box 73 and cable 75 therein when the lock box is closed; and an alarm circuit 77 including an alarm 78 comprising an alarm lamp 79 covered by a lens 80 and an alarm speaker 81.

The optical-fiber based security device 70 includes cable 75 which is mounted in fixed fashion to the lock box at end 82 and is detachably mounted to the lock box at the opposite end 83, illustratively via a plate-like end member 84 which is mounted to the cable end 83. Member 84 has a hole 86 therein for inserting the device onto lock box post 87. When the cable end member 84 is mounted on the post 87, the cable 75 can be secured against removal by closing and locking the lock box 73.

Referring to the alarm circuit 85 shown in FIG. 6, in use the cable 75 is looped around a bicycle parking rack or post 12 or the like, as shown also in FIG. 1, to provide physical and alarm security against removal of the security device 70 and the bicycle 11.

The optical fiber section of the cable 75 is actually a continuous optical loop, comprising an output section 750 which is connected to LED 88 at one end and is looped 180° around and past lock box post 87, and continues as return section 75R which is connected to the photodiode 89 for triggering alarm 78. That is, and referring specifically to FIG. 6, which schematically shows cable 75 secured about hitching post 12 and mounted to lock box post 87, both the optical input from LED 88 and the output from photodiode 89 are at the fixed end 82 of cable 75. LED 88 communicates to section 75O of the cable, which loops 180° within member 84, with return section 75R being connected to photodiode 89. Thus, unlike conventional systems, our cable is normally continuous or complete and does not require connection to post 87 or other connection to complete the circuit. In fact, lock box post 87 is not part of the optical/electrical alarm circuit. Furthermore, unlike conventional electrical circuits which require breaking of the electrical connection to trigger the alarm, the optical fiber conduction path used in cable 75 is relatively easily interrupted and, thus, triggers the alarm if merely damaged but not severed.

The alarm circuit 77 includes a transistor pair Q1 and Q2, controlled by the output of LED 89, and so arranged that when the optical loop of cable 75 is intact, Q2 is off, and when the optical loop is broken, Q2 turns on, switching current through the light 79 and speaker 81, causing them to operate. More specifically, the lamp 79 and speaker 81 are connected in series with battery 91. Latch button 71-operated arming switch 92 is closed to arm the circuit for use and opened to prevent operation of the circuit and conserve battery 91. Transistor Q2 is connected in series with the alarm 78 and the battery 91. The photodiode 89 is connected between the base and collector of Q1 via resistor R so that the application of light to the photodiode via the optical link of cable 75 maintains Q1 on which, in turn, maintains Q2 off when arming switch 92 is closed. The resistor R is used for the purpose of voltage drop. That is, for Q1's "on" condition to hold Q2 "off", Q1 has to bring Q2's base close to ground, by creating a much lower resistance to ground than R does to the + voltage. Without R, it cannot do this.

In normal operation, the cable 75 is connected at end 83 to post 87 to mechanically secure a device such as bicycle 11 to post 12. The light emitting diode 88 provides light along the optical fibers (described below) within cable 75 to photodiode 89, which applies current $i_p$ to Q1 to maintain Q2 off and preclude operation of the light/speaker alarm 78. In the event the light fibers are severed or damaged in an attempt to remove the device, light from light emitting diode 86 does not reach the photodiode 87, current $i_p$ ceases, Q1 turns off and Q2 turns on switching current through the speaker 81 and light 79 causing them to operate.

Note, the fiber optics-based alarm system is more secure than electrical current systems such as device 10. This is because electrical current-based devices can be bridged and the cable then severed between the bridged points without triggering the alarm. In contrast, there is no known way to bridge or bypass an optical circuit. In the first place, there is no known way to optically connect a bridging fiber. Secondly, as described below the cable comprises intertwined output and return loops along its length, which makes it difficult to connect any bridging device, if such a device did exist. Also, as mentioned above, the optical cable operates the alarm if damaged but not severed.

The unique cable construction and unique mounting of the fixed and detachable ends 82 and 83 are depicted in FIGS. 8, 9 and 10. Referring initially to FIGS. 8 and 9, the cable 75 comprises an outer flexible, bendable tube 96 of metal or plastic, strain fibers 98 of braided or straight material such as Kelvar TM or metal which prevent any mechanical strain being borne by the optical fibers, flexible optics tube 100 and a central core of loose optical fibers 102. At the cable's fixed end 82, tube 96 is connected to a PCB board 94, which supports the alarm circuit 77, by a tie-wrap 97. The strain fibers 98 are laced through holes 99-99 in board 94 and are secured thereto by epoxy or the like. As disclosed, the optical fibers in section 75O are connected to LED 88, while those of return section 75R are connected to photodiode 89.

Referring to FIGS. 8 and 10, detachable end 83, specifically, end member 84 comprises a two piece injection-molded part, which allows joining the optical fibers 102 separately from the strain fibers 98, e.g., using epoxy.

While a preferred embodiment and various alternative embodiments of my combination lock-alarm security device have been disclosed, those of skill in the art will readily implement modifications which are within the scope of the invention as defined by the appended claims.

What is claimed is:

1. A security device for locking a movable device such as a bicycle to an immovable object such as a post, comprising:

a lock box comprising a pair of hinged members configured to cooperatively engage the movable object when closed;
 a cable mounted on a reel within the lock box and being extendible from the box about an object such as an immovable object and onto an electrical terminal mounted within the box for securing the box and the movable object to the immovable object;
 a locking switch for locking the box in the closed position and the cable onto the terminal;
 an alarm circuit means within the box and comprising an alarm circuit and an arming circuit and including the cable as an integral circuit path of said arming circuit, said alarm circuit including at least one of audible means and visual means activated by severing of the cable for providing an alarm signal; and wherein
 the locking switch is incorporated in and is part of the alarm circuit and the arming circuit for arming the alarm circuit upon closure and locking of the lock box.

2. A security device for locking a first movable object such as a bicycle to a second object such as a post, comprising:
 (1) a lock box comprising a pair of hinged members configured to cooperatively engage the first object when closed;
 (2) a cable mounted on a reel within the lock box and being extendible from the box about a second object and onto an electrical terminal mounted within the box for securing the box and the first object to the second object;
 (3) a locking switch for locking the box in the closed position and the cable onto the terminal; and
 (4) a locking and alarm circuit comprising:
    (a) a first series alarm circuit including:

(i) a power supply; (ii) alarm means actuable by the power supply for providing at least one of visual and audible alarms; (iii) a first switching means, normally open, for maintaining the alarm means normally inoperative; (iv) second switching means, normally closed, and electrically actuable for opening to thereby render the alarm means inoperative; and (b) a second series arming and locking circuit including:

(i) a power supply; (ii) the locking cable; (iii) the second switching means; and (iv) third switching means, normally open, and being adapted for closing to establish a closed circuit path in conjunction with the locking cable for connecting the second switching means to the power supply to actuate said second switching means for opening said second switching means; and (c) means for:

(i) closing the third switching means to thereby open the normally closed second switching means to render the alarm means inoperable and (ii) closing the first switching means, whereby breaching the continuity of the locking cable, as by severing, opens the first circuit to thereby deactuate and close the second switching means to actuate the alarm means.

3. The security device of claim 2, wherein the lock box comprises a case having a reflector surface viewable from one side thereof and is adapted for rotatably mounting a reel;

wherein the lock box further comprises a spring-biased cable mounted on a reel rotatably mounted to the case, the reel comprising a second reflected surface viewable from the side of the lock box opposite the first side; and a closure plate attached to or integral with the case and having an aperture therein for inserting the reel therethrough to retain the reel within the case; and wherein the case further comprises a lid pivotally mounted to the case for opening and closing and having an aperture therein for exposing the second reflector surface when closed.

4. The locking and alarm circuit of claim 2, wherein the locking cable carries a separate conductive element which comprises the cable portion of the second circuit.

5. The locking and alarm circuit of claim 2, wherein the means for closing the first and third switching means comprises the locking switch.

6. The locking and alarm circuit of claim 2, wherein the locking switch comprises the first and second switching means and the means for closing the first and second switching means.

7. A security device for locking a first movable object such as a bicycle to a second object such as a post, comprising:

(1) a lock box comprising a pair of hinged members configured to cooperatively engage the first object when closed;

(2) a cable fixedly mounted at one end within the lock box and being adapted for detachable mounting at a second end onto a terminal mounted within the box for securing the box and the first object to the second object, said cable including mechanical strain-bearing means;

(3) a locking switch for locking the box in the closed position and the cable onto the terminal; and (4) a locking and alarm circuit comprising:

an alarm circuit means within the box and comprising an alarm circuit and an arming circuit and including the cable as an integral circuit path of said arming circuit, said alarm circuit including at least one of audible means and visual means activated by severing of the cable for providing an alarm signal; and wherein the locking switch is incorporated in and is part of the alarm circuit and the arming circuit for arming the alarm circuit upon closure and locking of the lock box; optical link means extending along said cable and having an optical inlet and outlet at said fixed end; a light source for applying light to said inlet; transistor means for operating said alarm means; and photodiode means communicating with said outlet responsive to the interruption of light transmission at said outlet for altering the on/off state of said transistor means to operate said alarm means.

8. The security device of claim 7, said alarm means being operated by inactuation of said transistor means.

9. The security device of claim 7, said alarm means being operated by actuation of said transistor means.

* * * * *